United States Patent
Edwards et al.

(10) Patent No.: US 10,230,531 B2
(45) Date of Patent: Mar. 12, 2019

(54) ADMISSIONS CONTROL OF A DEVICE

(71) Applicant: HEWLETT PACKARD ENTERPRISE DEVELOPMENT LP, Houston, TX (US)

(72) Inventors: Nigel Edwards, Bristol (GB); Michael R. Krause, Boulder Creek, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/323,705

(22) PCT Filed: Oct. 23, 2014

(86) PCT No.: PCT/US2014/061934
§ 371 (c)(1),
(2) Date: Jan. 3, 2017

(87) PCT Pub. No.: WO2016/064397
PCT Pub. Date: Apr. 28, 2016

(65) Prior Publication Data
US 2017/0163427 A1 Jun. 8, 2017

(51) Int. Cl.
| H04L 9/14 | (2006.01) |
| H04L 9/30 | (2006.01) |
| H04L 9/32 | (2006.01) |
| G06F 21/62 | (2013.01) |
| H04L 29/06 | (2006.01) |
| H04L 12/721 | (2013.01) |

(52) U.S. Cl.
CPC ........ *H04L 9/3263* (2013.01); *G06F 21/6209* (2013.01); *H04L 9/14* (2013.01); *H04L 9/30* (2013.01); *H04L 9/3271* (2013.01); *H04L 45/72* (2013.01); *H04L 63/0281* (2013.01); *H04L 63/0823* (2013.01); *G06F 2221/2141* (2013.01); *H04L 2209/56* (2013.01)

(58) Field of Classification Search
CPC ... H04L 9/3263; H04L 45/72; H04L 63/0281; H04L 9/14; H04L 9/30
See application file for complete search history.

(56) References Cited

U.S. PATENT DOCUMENTS

| 5,831,980 A | 11/1998 | Varma et al. |
| 5,956,408 A | 9/1999 | Arnold |
| 6,092,191 A * | 7/2000 | Shimbo ............... H04L 63/0428 |
| | | 380/258 |

(Continued)

FOREIGN PATENT DOCUMENTS

| CN | 1679003 A | 10/2005 |
| JP | 2007074761 | 3/2007 |
| TW | 200901724 | 1/2009 |

OTHER PUBLICATIONS

H. Krawczyk; "HMAC: Keyed-Hashing for Message Authentication"; Networking Group Request for Comments: 2104, Category: Informational; Feb. 1997; (11 pages).

(Continued)

*Primary Examiner* — Michael Pyzocha
(74) *Attorney, Agent, or Firm* — Rathe Lindenbaum LLP

(57) ABSTRACT

A control device performs an admissions control process with a first device to determine whether the first device is authorized to communicate over the communication fabric that supports memory semantic operations.

23 Claims, 4 Drawing Sheets

(56) References Cited

U.S. PATENT DOCUMENTS

| | | | |
|---|---|---|---|
| 7,191,437 | B1 | 3/2007 | Coatney et al. |
| 7,506,368 | B1* | 3/2009 | Kersey .............. H04L 63/0428 |
| | | | 726/12 |
| 7,725,603 | B1* | 5/2010 | Kanevsky ............. H04L 45/02 |
| | | | 709/204 |
| 7,778,253 | B2 | 8/2010 | Balakrishnan et al. |
| 8,130,953 | B2 | 3/2012 | Gustavsson |
| 8,245,032 | B2 | 8/2012 | Donley et al. |
| 8,442,526 | B1* | 5/2013 | Bertz ................ H04L 65/1016 |
| | | | 455/433 |
| 8,646,090 | B1 | 2/2014 | Gadde et al. |
| 9,087,189 | B1* | 7/2015 | Koeten ............... H04L 41/022 |
| 2002/0056050 | A1* | 5/2002 | Heiden .................. G06F 21/33 |
| | | | 726/10 |
| 2004/0049774 | A1 | 3/2004 | Boyd et al. |
| 2006/0045099 | A1* | 3/2006 | Chang .................. H04L 69/166 |
| | | | 370/400 |
| 2006/0264202 | A1* | 11/2006 | Hagmeier .......... H04L 63/0823 |
| | | | 455/411 |
| 2007/0067437 | A1* | 3/2007 | Sindambiwe ..... G06F 17/30899 |
| | | | 709/224 |
| 2007/0186279 | A1* | 8/2007 | Zimmer ............... G06F 21/305 |
| | | | 726/9 |
| 2008/0060055 | A1* | 3/2008 | Lau .................... H04L 63/0823 |
| | | | 726/3 |
| 2008/0095368 | A1 | 4/2008 | Iida et al. |
| 2008/0112405 | A1* | 5/2008 | Cholas ................. H04L 63/062 |
| | | | 370/389 |
| 2009/0073992 | A1 | 3/2009 | Makishima et al. |
| 2009/0080432 | A1* | 3/2009 | Kolakeri ................ H04L 12/66 |
| | | | 370/394 |
| 2009/0254647 | A1* | 10/2009 | Elzur ................. H04L 67/1097 |
| | | | 709/223 |
| 2010/0042689 | A1* | 2/2010 | Doggett ............. H04L 63/0218 |
| | | | 709/206 |
| 2010/0232793 | A1 | 9/2010 | Atkinson |
| 2012/0204032 | A1* | 8/2012 | Wilkins ................. H04L 9/006 |
| | | | 713/170 |
| 2012/0265840 | A1 | 10/2012 | Benner et al. |
| 2012/0284524 | A1 | 11/2012 | Ho |
| 2013/0042052 | A1* | 2/2013 | Colgrove ............. G06F 3/0608 |
| | | | 711/103 |
| 2013/0117577 | A1 | 5/2013 | Hars et al. |
| 2013/0227201 | A1* | 8/2013 | Talagala .............. G06F 12/0246 |
| | | | 711/103 |
| 2013/0312082 | A1* | 11/2013 | Izu ........................ H04L 9/0891 |
| | | | 726/13 |
| 2014/0095865 | A1* | 4/2014 | Yerra .................... H04L 9/3265 |
| | | | 713/156 |
| 2014/0115219 | A1 | 4/2014 | Ajanovic et al. |
| 2014/0201471 | A1 | 7/2014 | Cutter et al. |
| 2014/0223192 | A1 | 8/2014 | Dent et al. |
| 2014/0325013 | A1* | 10/2014 | Tamir ................... G06F 15/167 |
| | | | 709/212 |
| 2014/0325115 | A1* | 10/2014 | Ramsundar ......... G06F 12/0238 |
| | | | 711/102 |
| 2014/0331297 | A1* | 11/2014 | Innes ..................... H04L 63/08 |
| | | | 726/7 |
| 2015/0089010 | A1* | 3/2015 | Tsirkin .................. G06F 12/126 |
| | | | 709/212 |
| 2015/0146614 | A1* | 5/2015 | Yu ......................... H04L 5/0032 |
| | | | 370/328 |
| 2015/0220429 | A1* | 8/2015 | Cypher ................ G06F 11/2094 |
| | | | 711/170 |
| 2015/0341365 | A1* | 11/2015 | Basso ................. H04L 63/0236 |
| | | | 711/108 |
| 2015/0371327 | A1* | 12/2015 | Kohari .................. G06Q 40/04 |
| | | | 705/37 |
| 2016/0342510 | A1* | 11/2016 | Pani ..................... H04L 67/125 |

OTHER PUBLICATIONS

Novakovic, S. et al., Scale-out NUMA, (Research Paper), Mar. 1-4, 2014, 15 Pages.

R. Rivest; "The MD5 Message-Digest Algorithm"; Network Working Group Request for Comments: 1321; MIT Laboratory for Computer Science and RSA Data Security, Inc.; Apr. 1992; (20 pages).

S. Turner; "Updated Security Considerations for the MD5 Message-Digest and the HMAC-MD5 Algorithms"; Internet Engineering Task Force (IETF) Request for Comments: 6151, Updates: 1321, 2104, Category: Informational; ISSN: 2070-1721; Mar. 2011; (7 pages).

International Search Report and Written Opinion., PCT/US2014/061934; dated Jul. 13, 2015; 14 pages.

International Search Report and Written Opinion; PCT/US2014/063169; dated Jul. 29, 2015; 14 pages.

Shekhawat N. et al, To Enhance the Security in Terms of Malicious Node Attacks by Using Alarm Protocol in WSN, (Research Paper), Proceedings for IDCS, Apr. 2014, vol. 2, No. 4, 6 Pages.

* cited by examiner

ADMISSIONS CONTROL OF A DEVICE

BACKGROUND

A system, such as a computer or other type of system, can include various types of devices. Such devices can include a processor, an input/output device, a memory device, and other devices. The processor or I/O device can issue memory access commands over a memory bus to the memory device. The memory device can send data to the requesting processor or I/O device over the memory bus.

BRIEF DESCRIPTION OF THE DRAWINGS

Some implementations are described with respect to the following figures.

DETAILED DESCRIPTION

Network protocols such as the Transmission Control Protocol (TCP) and the Internet Protocol (IP) define formats and procedures for communication of data over communication fabrics. However, some network protocols may not be efficient for certain types of communications, such as communications for accessing memory (or another type of storage). Network protocols may not support high-bandwidth and low-latency communications that are often involved in access memory or another type of storage. In addition, network protocols can employ protocol headers that lead to increased overhead, which may not be appropriate for memory/storage access operations.

A different communication protocol (referred to as an "interconnect protocol" in the present disclosure) can be provided that supports memory semantic operations over a communication fabric. A "memory semantic operation" can refer to an operation that employs memory requests to communicate between a source device and a destination device. For example, the source device can be a processor, while the destination device can be a memory. The memory requests can include a read request, a write request, an atomic operation request, and so forth, which can be issued by the source device to access data in the destination device. In some implementations, the interconnect protocol can support memory semantic operations as well as other types of operations between a source device and a destination device.

In other examples, a source device can include a different type of electronic device, such as a graphics controller, an input/output (I/O) controller, a network interface controller, a computer, and so forth, while a destination device can also include any of the foregoing devices. More generally, a source device or destination device can include an entire machine (e.g. a computer, storage system, communication system, a handheld device such as a smartphone or personal digital assistant, a game appliance, etc.), or alternatively, can include one or a combination of electronic components within a machine (e.g. a processor, a memory device, a persistent storage device, a graphics controller, an I/O controller, a network interface controller, etc.).

In some implementations, the interconnect protocol can support relatively high bandwidth and low latency transactions over a communication fabric that is appropriate for memory access operations. Some details regarding transaction packet formats according to the interconnect protocol that can be communicated over the communication fabric are provided further below.

In a communication fabric that can interconnect many devices that are able to communicate using the interconnect protocol, security can become an issue. To provide security, the interconnect protocol may specify use of a security feature, which can be used to prevent unauthorized or malicious communications by devices connected to the communication fabric.

Figure 1:
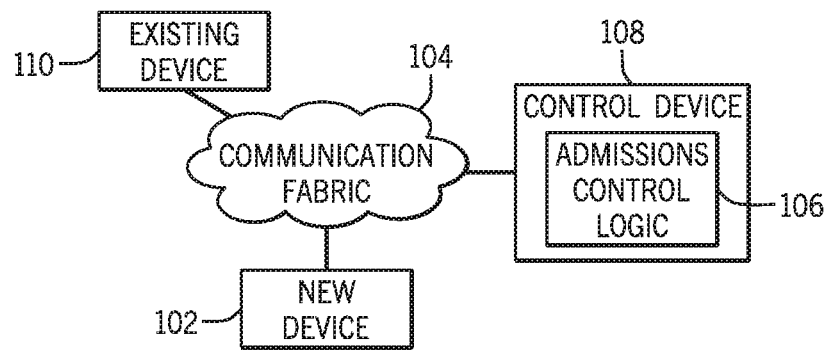
FIG. 1 is a schematic diagram of an example arrangement that includes a communication fabric and devices coupled to the communication fabric, according to some implementations.

In accordance with some implementations, as shown in FIG. 1, techniques or mechanisms are provided to perform an admissions control process for a new device 102 that is able to communicate using the interconnect protocol that supports memory semantic operations. A "new device" can refer to a device that was not previously connected to a communication fabric 104 and has been newly added to the communication fabric for the first time. Alternatively, a "new device" can refer to a device that was previously disconnected or deactivated and then re-connected or re-activated on the communication fabric 104.

The admissions control process can be performed by admissions control logic 106 in a control device 108 connected to the communication fabric 104. The admissions control process uses a security element to verify the new device 102 so that the control device 108 can determine whether or not the new device is authorized to communicate over the communication fabric. As discussed further below, examples of the security element can include a public key and/or a private key, a certificate, or any other item that can be used by one device to determine whether another device is authorized to perform a certain task (or tasks). If authorized, a transaction integrity key can be provided to the new device 102 to allow implementation of the security feature of the interconnect protocol by the new device 102. As discussed further below, the security feature of the interconnect protocol can include a security header provided in each transaction packet communicated over the communication fabric 104.

In some examples, a transaction integrity key (TIK) can include a symmetric key that can be generated by a key distribution server that is able to communicate over the communication fabric 104. A symmetric key is a key that is used for both encryption and decryption of a message. In other examples, other types of TIKs can be employed.

In some cases, the new device 102 may not support the security feature. In such cases, a gateway (discussed further below) may be configured to act as proxy for the new device 102. The proxy is provided between the new device 102 and other devices connected to the communication fabric 104. The proxy can implement the security feature of the interconnect protocol on behalf of the new device 102. The proxy can also perform other tasks on behalf of the new device 102.

Once the admissions control logic 106 determines that the new device 102 is allowed to communicate over the communication fabric 104, the new device 102 can perform communications with an existing device 110 connected to the communication fabric 104. An "existing device" can refer to a device that has previously been connected to or activated on the communication fabric 104.

The communication fabric 104 includes various communication media (e.g. electrical conductors, electrical wires, optical fibers, optical paths, wireless links, etc.) and communication nodes (e.g. switches, routers, etc.) that are capable of forwarding or routing data packets between a source device and a destination device. Although just one new device 102 and one existing device 110 is depicted in FIG. 1, it is noted that there can be many devices connected to the communication fabric 104.

Figure 2:
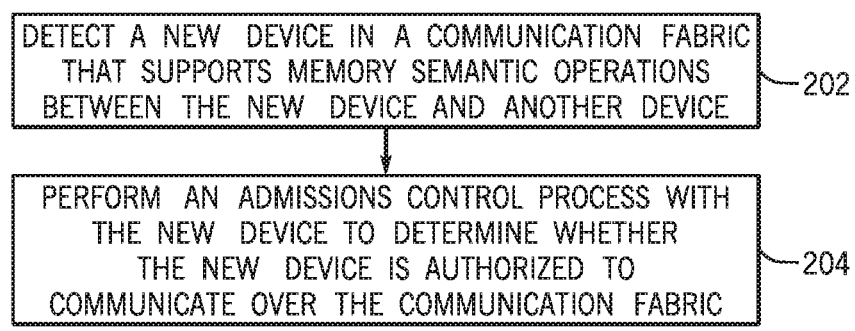
FIG. 2 is flow diagram of an example process according to some implementations.

FIG. 2 is a flow diagram of an example process that can be performed by the admissions control logic 106. The admissions control logic 106 detects (at 202) the new device 102 in the communication fabric 104 over which an interconnect protocol can be used that supports memory semantic operations between devices. The admissions control logic 106 performs (at 204) an admissions control process with the new device to determine whether the new device is authorized to communicate over the communication fabric 104.

The admissions control process can use a security element to determine whether or not the new device 102 is authorized to communicate over the communication fabric 104. In some examples, the security element can include a key (e.g. a public key and/or a private key). As a further example, the admissions control process can employ a challenge-response protocol initiated by the admissions control logic 106. In the admissions control process that involves the control device 108 and the new device 102, the control device 108 is the challenger, and the new device 102 is the responder. The challenge-response protocol includes the challenger (control device 108) sending the responder (new device 102) a newly created random nonce. A nonce is an arbitrary number used just once in a cryptographic communication. A nonce can be a random or pseudo-random number.

In response to the nonce, the responder returns, to the challenger, a signature derived from the nonce using the responder's private key. The challenger can then verify the signature using the corresponding public key. Verification of the signature using the corresponding public key by the challenger results in a successful admissions control process, such that the new device 102 is admitted to the communication fabric 104. However, if the challenger is unable to verify the signature, then the admissions control process is considered to have failed, in which case the new device 102 is not allowed to communicate over the communication fabric 104.

Another example of a challenge-response protocol is one in which encryption and decryption are used. The challenger creates a nonce (similar to the nonce discussed above) and encrypts the nonce using the responder's public key. The encrypted nonce is sent as ciphertext (an encrypted version of the nonce) to the responder. The responder decrypts the ciphertext using the private key of the responder, and returns the decrypted nonce back to the challenger. If the challenger determines that the nonce received from the responder matches the nonce sent by the challenger to the responder, then the admissions control process is considered to have succeeded.

Note that the public key used by the challenger in either of the challenger-response protocols discussed above may have been communicated to the control device 108 by a specific entity, which can be a trusted entity.

In other implementations, the admissions control process may be based on use of a certificate provided at the new device 102. The certificate at the new device 102 includes information about a public key. The certificate is signed by an issuing authority that is trusted in the communication fabric 104. The certificate can reside at a specified location in the new device 102, where the specified location can be a "well-known address"—an address that is established by a standard or by agreement. The control device can access the certificate in the new device 102 at the specified location. The certificate is signed by the private key of the issuing authority. When the certificate is retrieved by the control device 108, the control device 108 uses the corresponding public key to verify the certificate. Successful verification of the certificate results in successful performance of the admissions control process.

Figure 3:
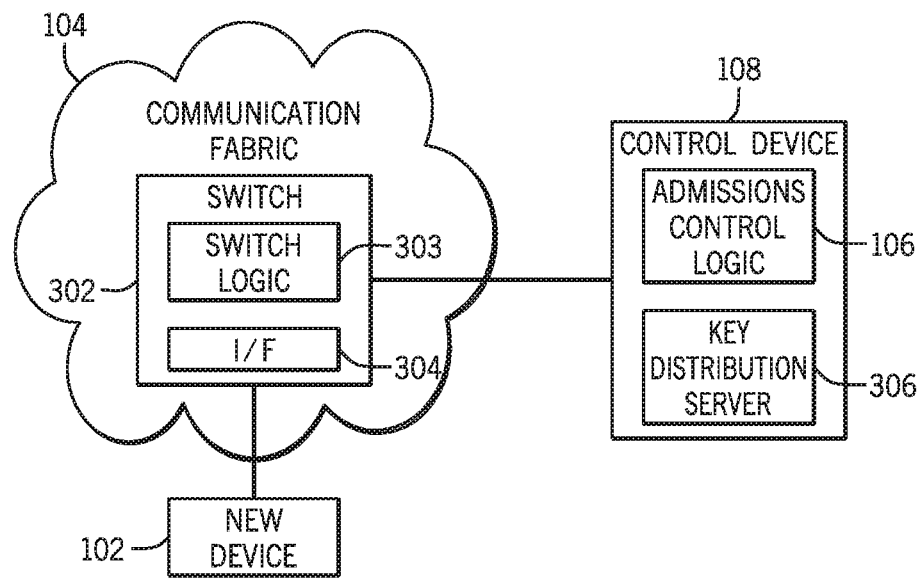
FIG. 3 is a schematic diagram of a further example arrangement that includes a communication fabric and devices coupled to the communication fabric, according to further implementations.

FIG. 3 is a schematic diagram of an example arrangement according to further implementations. FIG. 3 shows a switch 302 provided as part of the communication fabric 104. The new device 102 is connected to an interface 304 of the switch 302. The switch 302 detects the new device 102 if the interface 304 was previously inactive but becomes active in response to connection of the new device 102 to the interface 304 or activation of the new device 102 that was previously deactivated. Alternatively, the switch 302 can detect the new device 102 in response to a message or other indication sent by the new device 102 to the switch 302 upon connection of the new device 102 to the switch 302 or activation of the new device 102.

Upon detecting the new device 102 (but prior to the new device 102 having gone through an admissions control process), the switch 302 allows the new device 102 to send packets to a specified address (or set of specified addresses). In some implementations, devices on the communication fabric 104 are uniquely identified using component identifiers (CIDs). Each device on the communication fabric 104 is assigned one or multiple CIDs. In a given transaction, the source device is identified using a source SID (SCID), while the destination device is identified using a destination CID (DCID). In other examples, the source device and the destination device can be identified using other types of identifiers, such as IP addresses, TCP ports, and so forth.

For the new device 102 that has not yet gone through the admissions control process, the switch 302 allows the new device 102 to send packets to just a specific ACID (or set of DCIDs), which correspond(s) to the control device 108 (or other control device) that performs admissions control. Any packet sent to a ©CID other than the specified DCID(s) is dropped by the switch 302.

Figure 4:
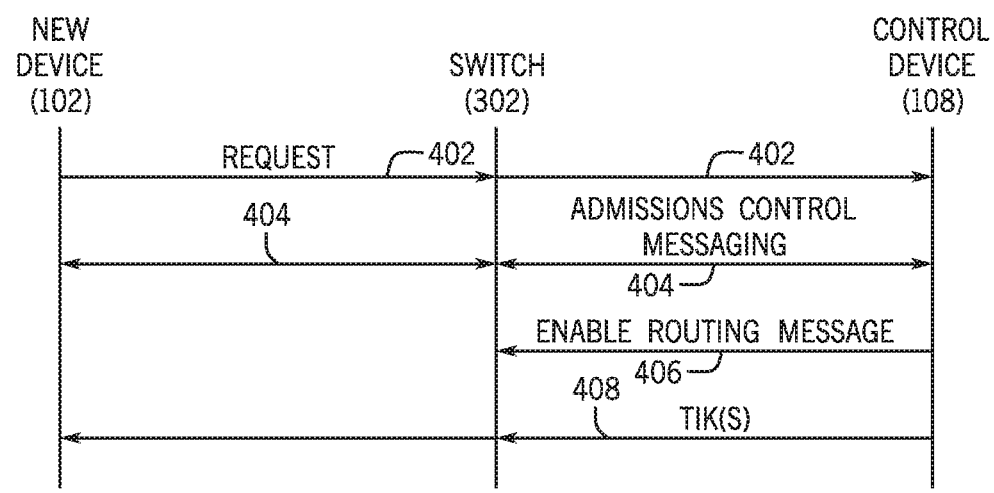
FIG. 4 is a message flow diagram of an example process among a new device, a switch, and a control device, according to some implementations.

As further shown in FIG. 4, in response to receiving a packet received from the new device 102, where the packet can correspond to a request (402) by the new device 102 to access the communication fabric 104, or to register in the communication fabric 104, the admissions control logic 106 in the control device 108 can start the admissions control process as discussed above.

The admissions control process involves admissions control messaging (404) exchanged between the control device 108 and the new device 102. The admissions control messaging is forwarded through the switch 302. The admissions control messaging 404 can include a challenge and a response, as discussed above, or retrieval of a certificate from the new device 102 for verification at the control device 108.

If the control device 108 determines that the admissions control process is successful, then the control device 108 sends an enable routing message (406) to the switch 302 to enable routing for the new device 102. Once routing is enabled for the new device 102, packets sent by the new device 102 or packets destined to the new device 102 can be routed accordingly by the switch 302. In some examples, along with the enable routing message (406), the control device 108 can also send control information to update forwarding information (e.g. forwarding table, flow table, routing table, etc.) at the switch 302. The switch 302 uses the forwarding information to forward packets to a target destination.

In addition, in some implementations, the control device 108 can act as a key distribution server and can issue one or multiple transaction integrity keys (TIKs) (408) to the new device 102. In some examples, a TIK provides for security for transactions over the communication fabric 104. The TIK can be used to generate a security value that is included in a security header of a transaction packet.

Figure 5:
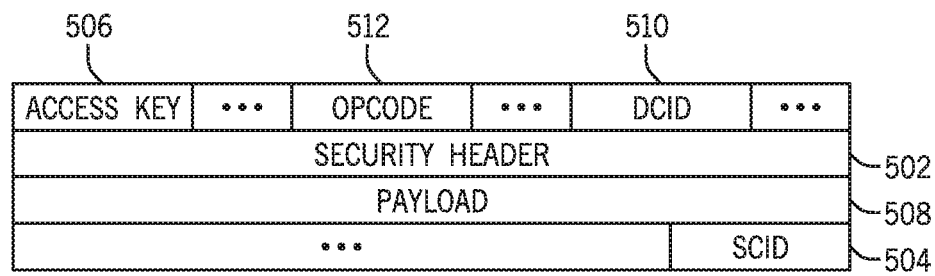
FIG. 5 is a schematic diagram of an example format of a transaction packet, according to some implementations.

A transaction packet can include various fields as depicted in FIG. 5, in some examples. Although example fields are shown in the transaction packet of FIG. 5, it is noted that in other examples, other fields or other arrangements of fields can be provided. As depicted in FIG. 5, one of the fields included in a transaction packet includes a security header 502, which can include the security value produced using the TIK according to some implementations.

For example, given a message MSG, where MSG can represent any content that is to be communicated between a source device and a destination device in a transaction packet, a security value, SMH, can be produced according to the following: SMH=HMAC(TIK, MSG), where HMAC represents "Hash-Based Message Authentication Code." In some examples, HMAC is described in Request for Comments (RFC) 2104, "HMAC: Key-Hashing for Message Authentication," dated February 1997; and RFC 6151, entitled "Updated Security Considerations for the MD5 Message-Digest and the HMAC-MD5 Algorithms," dated March 2011. In other examples, other techniques for producing the security value based on the TIK for inclusion in the security header 502 of FIG. 5 can be employed.

In some examples, a TIK can be a symmetric key that can be generated by the key distribution server 306 of FIG. 3, which can be implemented in the control device 108 or in another device, A symmetric key is a key that is used for both encryption and decryption of a message. In other examples, other types of TIKs can be employed.

The security value included in the security header 502 of a transaction packet can be used to perform device-device authentication over the communication fabric 104 in which any two devices are able to authenticate each other using a cryptographically secure mechanism based on the security value.

In some examples, the security value in the security header 502 can be used to prevent spoofing of a sender identifier (e.g. SCID in an SCID field 504 shown in FIG. 5) of a sender device. Spoofing of a sender identifier occurs when one entity successfully masquerades as another entity by falsifying information, in this case the sender identifier, to gain access to a resource. By using the security value in the security header 502, the sender device can be cryptographically verified by a destination device using the TIK at the destination device. For example, the destination device can decrypt the security value, using the TIK, in the security header 502 to produce a value that can be compared to a value that is calculated based on content of the transaction packet that is to be protected. If the values match, then transaction packet is authentic.

The security value in the security header 502 can also be used to prevent spoofing of another value included in a transaction packet, such as an access key included in an access key field 506 of the transaction packet shown in FIG. 5. An access key can be an identifier used to validate access privileges to a specified resource (or resources). A resource can include any or some combination of the following: a memory region of a memory device (or memory devices), a storage region of a persistent storage device (or storage devices), an electronic component or a portion of an electronic component (e.g. a processor, a memory, a switch, a PGA, a digital signal processor or DSP, a general processing unit or GPU, etc.), an accelerator (which is an entity that is used to perform computations on behalf of another device), a shared I/O component (e.g. a network or storage controller, a graphics controller, etc.), an ingress or egress interface, and so forth. If a given resource is associated with an access key, then any transaction packet targeting the resource that does not contain the access key in the access key field 506 will violate resource permissions and can trigger an access violation error.

In some cases, an access key can be spoofed by a malicious entity, to gain unauthorized access to a resource. However, by including a security value in the security header 502, TIK can be used to verify the authenticity of the access key in the access key field 506.

In some examples, the transaction packet of FIG. 5 can include other fields, including a payload field 508 (for carrying a data payload when appropriate) of the respective transaction, a DCID field 510 (that includes the DCID for identifying the destination device), and an Opcode field 512 that contains an operation code for specifying a respective operation (e.g. a read operation, a write operation, etc.).

The foregoing describes admissions control for a new device (such as new device 102 in FIG. 1 or 3) and provision of a TIK to allow for implementation of a security feature according to some implementations.

A further issue associated with an arrangement that includes a communication fabric connected to various devices is that some devices may not support the security feature of the communication fabric 104. For example, some devices may not support the security header 502 included in a transaction packet as shown in FIG. 5. Such devices would not be able to produce a security value in the security header 502, and also would not be able to perform verification using the security header 502.

Figure 6:
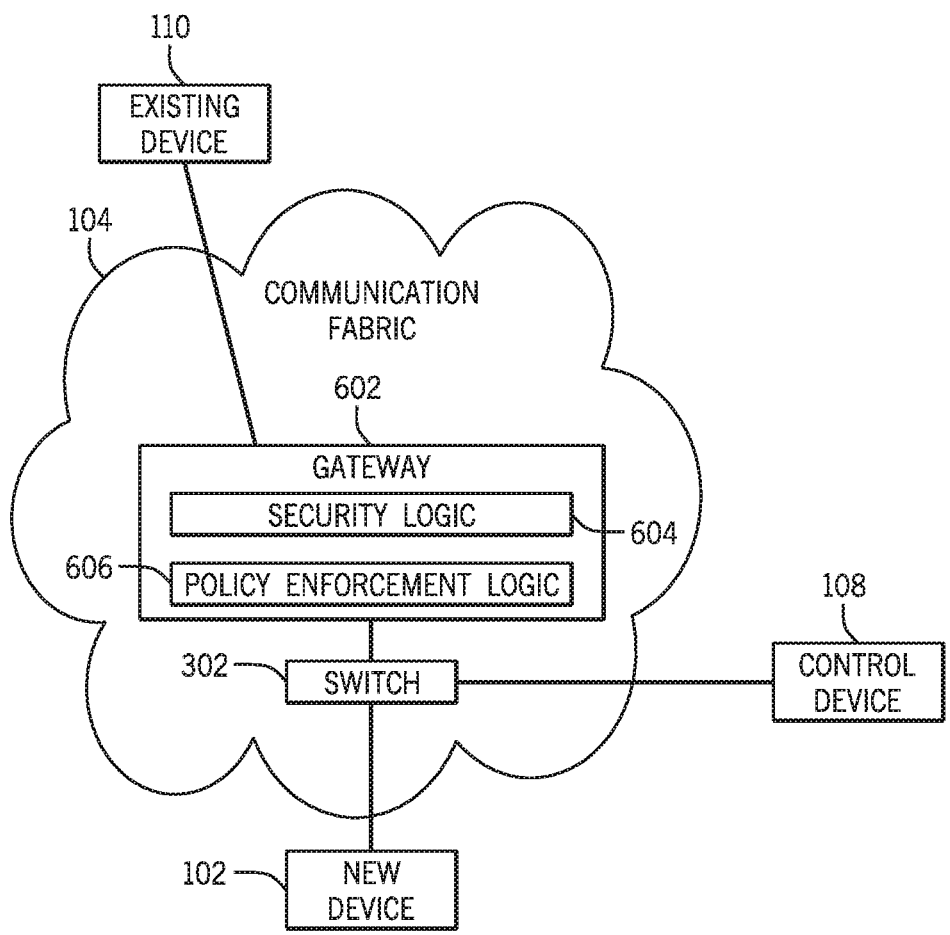
FIG. 6 is a schematic diagram of another example arrangement that includes a communication fabric and devices coupled to the communication fabric, according to additional implementations.

In some examples, as shown in FIG. 6, a gateway 602 can be provided to act as a proxy for a device (e.g. the new device 102) that does not support the security header 502 and/or other features of the interconnect protocol governing communications over the communication fabric 104. In some implementations, in the arrangement of FIG. 6, the control device 108 can perform admissions control as discussed above for the new device 102 that does not support at least the security header 502. Assuming that the admissions control is successful, the control device 108 can configure the gateway 602 to act as a proxy for the new device 102. Any communications between the new device 102 and another device (e.g. the existing device 110) over the communication fabric 104 is passed through the proxy provided by the gateway 602. The gateway 602 includes a security logic 604 that is able to add a security header to a transaction packet issued by the new device 102. The switch 302 is configured to route any transaction packet sent by the new device 102 to the DCID of the gateway 602; this DCID is referred to as the gateway DCID. The gateway 602 receives the transaction packet from the new device 102, and applies one or multiple transformations on the transaction packet before the transaction packet is sent over the communication fabric 104 to the destination device. One type of transformation that is performed is the insertion of the security header 502 into the transaction packet by the security logic 604 in the gateway 602.

Note that when a transaction packet is received from another device that is targeted to the new device 102, the security logic 604 can perform verification based on the security header 502 of the transaction packet. If the verification is successful, then the security logic 604 can remove the security header 502 from the transaction packet, and can send the modified transaction packet through the switch 302 to the new device 102.

In some implementations, the gateway 602 also includes a policy enforcement logic 606 that is able to enforce a policy for communications involving any device that does not support one or multiple features of the interconnect protocol governing communications over the communication fabric 104. For example, the policy enforcement logic 606 can apply any one of or some combination of the following transformations to a transaction packet from the new device 102: insert an access key or change an access key of the transaction packet, change the SCID and/or the DCID in the transaction packet, and restrict the scope of transactions that the new device 102 is allowed to engage in.

Also, the policy enforcement logic 606 can specify that just certain types of transactions can be performed by the new device 102, while other types of transactions are not allowed to be performed by the new device 102. This restriction can be enforced by specifying restricted operation codes that can be included in the Opcode field 512 of a transaction packet. Also, the restriction can be accomplished by specifying a restriction on addresses that can be accessed by the new device 102, such that the new device 102 is allowed to access just specific locations in an address space. More generally, policy enforcement can include checking for specifically permitted access keys, DCIDs, address ranges, and operation codes. Any transaction packet from a source device that is outside of the enforcement policy (e.g. does not include an access key from among the permitted access keys, a DCID from among the permitted DCIDs, an address from among the permitted address ranges, and an operation code from among the permitted operation codes) is dropped by the gateway 602. The gateway 602 can also issue an alert regarding this policy violation.

The transformation applied by the policy enforcement logic 606 can also include an address translation, where an address in the transaction packet specifying a resource to be accessed can be translated from an original value to a different value.

Although the gateway 602 is shown as being separate from the switch 302, it is noted that in some implementations, the gateway 602 can be part of the switch 302.

Although the foregoing refers to using the gateway 602 to enforce restrictions for a device that does not support feature(s) of the interconnect protocol, it is noted that restrictions can be enforced by the gateway 602 for devices that do support all features of the interconnect protocol. In other words, the policy enforcement logic 606 can enforce policy restrictions for any type of device.

In some examples, to produce the security value for inclusion in the security header 502 by the security logic 604, the gateway 602 first applies any transformations (as part of performance of policy enforcement) on a transaction packet, and the security value is generated based on the transformed transaction packet using the TIK provided by the control device 108.

Figure 7:
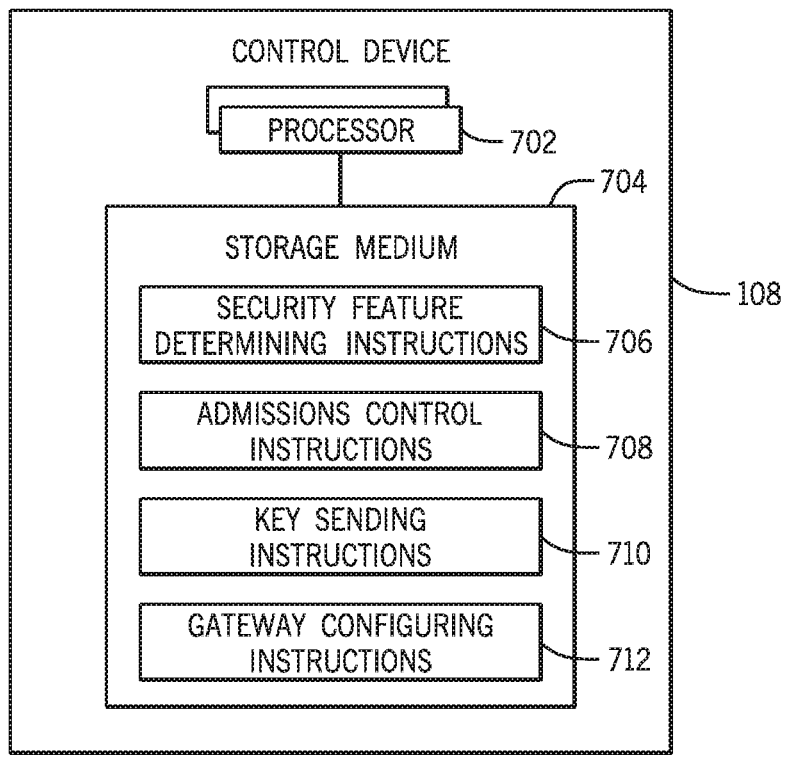
FIG. 7 is a block diagram of an example control device, according to some implementations.

FIG. 7 is a block diagram of an example control device 108 in accordance with some implementations. Note that the control device 108 can be a component within a computer (or within an arrangement of computers).

The control device 108 includes one or multiple processors 702. A processor can include a microprocessor or a core of the microprocessor, a microcontroller, a physical processor module or subsystem, a programmable integrated circuit, a programmable gate array, and so forth.

In addition, the control device 108 includes one or multiple non-transitory computer-readable or machine-readable storage media 704, which can store machine-readable instructions. As examples, the storage medium (or storage media) 704 can store security feature determining instructions 706 to determine whether a device supports a security feature, admissions control instructions 708 (corresponding to the admissions control logic 106 shown in FIG. 1 or 3), key sending instructions 710 (which can correspond to the key distribution server 306 of FIG. 3) to send a key (e.g. TIK) to a device, and gateway configuring instructions 712 to configure the gateway 602 to act as proxy for a device that does not support a security feature according to some implementations.

Figure 8:
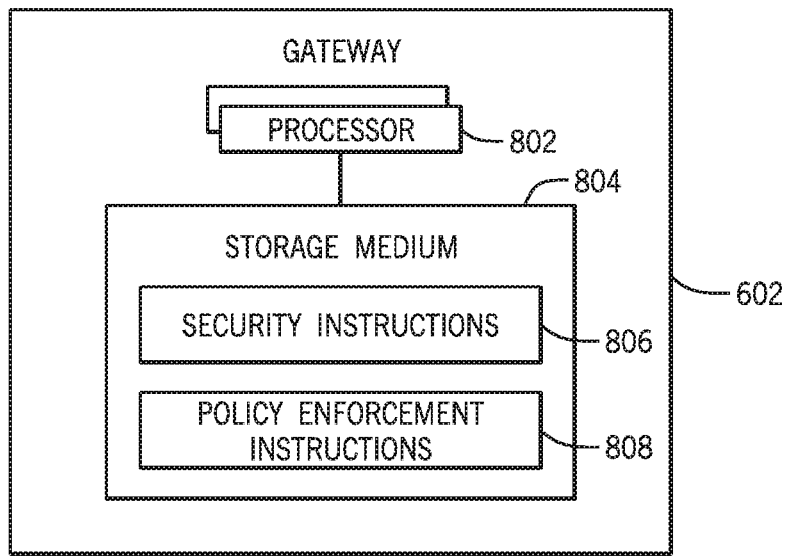
FIG. 8 is a block diagram of an example gateway, according to some implementations.

FIG. 8 is a block diagram of an example gateway 602 according to some implementations. Note that the gateway 602 can be a component within a computer (or within an arrangement of computers). The gateway 802 includes one or multiple processors 802, In addition, the gateway 602 includes one or multiple non-transitory computer-readable or machine-readable storage media 804, which can store machine-readable instructions, including security instructions 806 (for implementing the security logic 604 of FIG. 6), and policy enforcement instructions 808 (for implementing the policy enforcement logic 606 of FIG. 6), The storage medium (or storage media) 704 or 804 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or any other types of volatile or non-volatile storage. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   detecting, by a control device, a first device in a communication fabric that supports memory semantic operations between the first device and a second device, wherein the first device is one component of a larger group of components forming a larger device, the first device being selected from a group of components consisting of: an individual memory device, an individual graphics controller; an individual accelerator, an individual I/O component; an individual ingress interface; an individual egress interface; an individual digital signal processor, and an individual switch; and
   performing, by the control device, an admissions control process with the first device to determine whether the first device is authorized to communicate over the communication fabric, wherein the admissions control process comprises retrieving a certificate from an address within an address space at the first device.

2. The method of claim 1, further comprising:
   in response to the admissions control process succeeding, enabling, by the control device, communication by the first device over the communication fabric.

3. The method of claim 2, wherein enabling, by the control device, the communication by the first device over the communication fabric comprises instructing a switch to enable routing of packets for the first device.

4. The method of claim 3, wherein detecting the first device comprises detecting the first device that is newly connected to or newly activated in the communication fabric, wherein the switch is to route packets of the newly connected or newly activated first device just to the control device until the admissions control process succeeds.

5. The method of claim 1, further comprising:
   in response to the admissions control process succeeding, sending, by the control device, a transaction integrity key to the first device, the transaction integrity key used in providing security for transactions of the first device.

6. The method of claim 1, wherein performing the admissions control process uses a security element to verify the first device.

7. The method of claim 6, wherein the security element is at least one of a public key, a private key, and a certificate.

8. The method of claim 1, further comprising:
   determining, by the control device, whether the first device supports a security header in transactions over the communication fabric; and
   in response to determining that the first device does not support the security header, configuring, by the control device, a gateway to act as a proxy for the first device, the proxy to insert the security header for a transaction of the first device.

9. The method of claim 8, wherein configuring the gateway further comprises configuring the gateway that performs at least one selected from among: inserting or modifying an access key in a packet on behalf of the first device to access a resource over the communication fabric, changing a component identifier in the packet for communication involving the first device, and restricting transaction types that are allowed for the first device.

10. The method of claim 1, wherein the first device is an individual memory device and wherein the second device is a processor.

11. A control device comprising:
    at least one hardware processor to:
        determine whether a first device supports a security feature, wherein the first device is one component of a group of components forming a larger device, the first device being selected from a group of components consisting of: an individual memory device, an individual graphics controller, an individual accelerator; an individual I/O component; an individual ingress interface; an individual egress interface; an individual digital signal processor; and an individual switch;
        in response to determining that the first device supports the security feature,
            perform admissions control to determine whether the first device is authorized to communicate over a communication fabric that supports memory semantic operations, and
            send a key to the first device to implement the security feature; and
        in response to determining that the first device does not support the security feature,
            configure a gateway to act as a proxy for the first device to implement the security feature such that the gateway generates a hash-based device authenticating security value and inserts the hash-based device authenticating security value into a security header of a packet received from the first device.

12. The control device of claim 11, wherein the key is for generating a security value to include in a transaction packet sent by the first device over the communication fabric.

13. The control device of claim 11, wherein the admissions control comprises performing a challenge-response process or retrieving a certificate from the first device.

14. The control device of claim 11, wherein the at least one processor is to further, in response to determining that the first device supports the security feature, configure the switch to enable routing of packets between the first device and other devices connected to the communication fabric.

15. The control device of claim 11, wherein the configuring of the gateway further comprises configuring the gateway that performs at least one selected from among: inserting or modifying an access key in a packet on behalf of the first device to access a resource over the communication fabric, changing a component identifier in the packet for communication involving the first device, and restrict transaction types that are allowed for the first device.

16. An article comprising at least one non-transitory machine-readable storage medium storing instructions that upon execution cause a gateway to:
    in response to an admissions control process authorizing a first device to communicate over a communication fabric that supports memory semantic operations, implement a security feature on behalf of the first device, wherein the security feature includes generating a device authenticating hash-based security value and inserting the hash-based device authenticating security value into a security header of a packet received from the first device, wherein the first device is an individual component of a group of components forming a larger a device selected from a group of components consisting of: an individual memory device, an individual graphics controller; an individual accelerator; an individual I/O component; an individual ingress interface; an individual egress interface; an individual digital signal processor, and an individual switch; and perform policy enforcement comprising at least one selected from among: inserting or modifying an access key in a packet on behalf of the first device to access a resource over the communication fabric, changing a component identifier in the packet for communication involving the first device, and restricting transaction types that are allowed for the first device.

17. A method comprising:

receiving, with the gateway, a transaction packet from a first device in a communication fabric, wherein the first device is one component of a group of components forming a larger device, the first device being selected from a group of components consisting of: an individual memory device, an individual graphics controller; an individual accelerator; an individual I/O component; an individual ingress interface; an individual egress interface; an individual digital signal processor; and an individual switch;

adding, with the gateway, a security header to the transaction packet;

receiving, with a gateway, a transaction integrity key from a control device;

generating, with the gateway, a hash-based device authenticating security value;

inserting the hash-based device authenticating security value into the security header of the transaction packet; and forwarding the transaction packet for transmission to a second device in the communication fabric.

18. The method of claim 17 further comprising performing, with the gateway, policy enforcement comprising at least one selected from among: inserting or modifying an access key in a packet on behalf of the first device to access a resource over the communication fabric, changing a component identifier in the packet for communication involving the first device, and restricting transaction types that are allowed for the first device.

19. The method of claim 17 further comprising:

receiving, with the gateway, a second transaction packet targeting the first device, the second transaction packet comprising a second hash-based device authenticating security value in a second security header of the second transaction packet;

performing, with the gateway, verification based upon the second hash-based device authenticating security value; and in response to successful verification, removing the second security header from the second transaction packet and transmitting the second transaction packet without the second security header through a switch to the first device in the communication fabric.

20. The method of claim 17 further comprising: inserting or modifying, with the gateway, an access key in the transaction packet on behalf of the first device to access a resource over the communication fabric.

21. The method of claim 17 further comprising changing, with the gateway, a component identifier in the transaction packet for communication involving the first device.

22. The method of claim 17 further comprising restricting, with the gateway, transaction types that are allowed for the first device.

23. The method of claim 17 further comprising the gateway being configured by a control device to serve the first device in response to the first device not supporting a security feature in the transaction packet.

* * * * *